PRE-ETCH TREATMENT OF ACRYLONITRILE-BUTADIENE-STYRENE RESINS FOR ELECTROLESS PLATING

Filed Sept. 23, 1969

INVENTORS.
EILEEN MAGUIRE
LEON A. KADISON
BY
Christie, Parker & Hale
ATTORNEYS 3,660,293
PRE-ETCH TREATMENT OF ACRYLONITRILE-BUTADIENE-STYRENE RESINS FOR ELECTROLESS PLATING Eileen Maguire, San Gabriel, and Leon A. Kadison, Pasadena, Calif., assignors to Crown City Plating Co., El Monte, Calif.

Filed Sept. 23, 1969, Ser. No. 860,236
Int. Cl. B44d *1/092*
U.S. Cl. 252—79.4 21 Claims

ABSTRACT OF THE DISCLOSURE

Solutions containing glycol diacetate, particularly solutions containing glycol diacetate at concentrations close to solution saturation, are used as a pre-etch to improve the adhesion of metals to ABS resins in electroless plating processes.

BACKGROUND OF THE INVENTION

The present invention relates to electroless plating of acrylonitrile-butadiene-styrene resins (hereinafter called ABS resins), more particularly to improving the bond strength between an electroless deposited metal coating and the ABS resin substrate.

Recently, considerable demand has developed for metal plating on non-conductive articles, particularly plastic articles. In the finished product the desirable characteristics of the plastic and metal are combined to offer thereby the technical and aesthetic advantages of each. For instance, the low-weight, easily-formed, high-impact strength of articles fabricated from ABS resins may be aesthetically and mechanically enhanced by metal coating. Although ABS resins, like most plastics, are electrically non-conductive, a metal bond to the surface can be established by an initial plating operation, known as "electroless plating." This is typically accomplished by conditioning the surface for plating by etching with a strong oxidizing acid, seeding the surface by contact with a noble metal salt solution, e.g., a palladium chloride solution, then immersing the seeded surface in an auto-catalytic electroless solution where an initial coating of a conductive metal, e.g., copper and nickel, is established by chemical deposition. The metal coating formed acts as a bus which allows a thicker metal coating to be built up electrolytically.

Adhesion between the metal plate and the ABS resin substrate is, however, dependent on the strength of the resin-metal bond. Adhesion has been fairly poor, ranging from only between about 5 to 12 lbs. per inch using the standard 90° peel test.

It has been proposed to improve adhesion by organically pre-etching the surface prior to etching with the strong acid. The system offered was ketone based and a very strong ABS solvent.

Organic pre-etching with this system did not, however, find acceptance for several reasons. Aesthetically the system had a dertimental effect on the final appearance of the article and was found not to improve the adhesion of electroless deposited nickel. It also tended to undermine the resin substrate and, although bond strength was improved, generally to about 13 to 15 lbs. per inch when the etchant was properly employed, failure often occurred within the body of the resin, as evidenced by an extensive removal of the plastic with the metal plate during the peel test.

SUMMARY OF THE INVENTION

It has now been found that the adhesion of electroless deposited metal coatings to an ABS resin substrate can be substantially improved without a detrimental effect on the appearance by preceding etching with a strong oxidizing acid with an organic etch using a solution containing glycol diacetate in a media substantially inert with respect to the ABS resin. Preferred pre-etch solutions are aqueous based in which the glycol diacetate is maintained at a concentration within about 4% by volume of maximum saturation. In addition, improvement in adhesion will be enhanced by terminating the etching effect of glycol diacetate by hydrolysis with an acid or base wash immediately after organic etching and before contact with the oxidizing acid. Pre-etching with glycol diacetate has been found to increase the total adhesion of the metal coating to over 30 lbs. per inch for both copper and, quite unexpectedly, nickel. Adhesion is further optimized by employing as the strong oxidizing acid a solution containing chromic acid and trivalent chromium ions and by immersing the electrolessly plated substrate in a dilute aqueous anionic or non ionic surfactant solution prior to normal aging to prevent the drying out of absorbed salts and oxidation of the electrolessly deposited layer.

DRAWINGS

DESCRIPTION

According to the present invention, the bond strength of metals electrolessly deposited on an ABS resin substrate is remarkedly improved by preceding etching with a strong oxidizing acid with the organic pre-etch solution containing as the dominant etchant, glycol diacetate.

The ABS resin substrates, treated according to the practice of this invention, are generally articles molded or fabricated from plateable grades of resins obtained by the interpolymerization of acrylonitrile, butadiene and styrene (ABS).

The organic pre-etch solutions used for conditioning the ABS resin, in accordance with the practice of this invention, are solutions containing, as the predominant etchant, glycol diacetate, dissolved in a media substantially inert with respect to the ABS resin. The media used may vary widely and includes, among others, water, acetic acid, alcohols, glycols, glycol ethers and the like, as well as mixtures thereof. Water, for economic reasons, and since it is the chief fluid media found at plating operations, is preferred.

Figure 1:
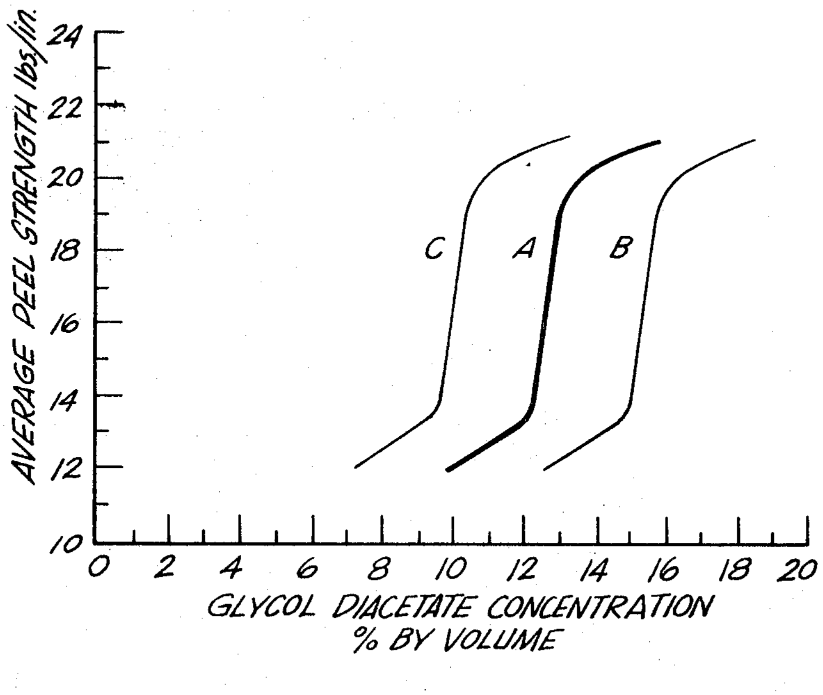
FIG. 1 is a relative illustration of the strength of a copper bond to an ABS resin substrate as a function of glycol diacetate concentration in a water based media.

While the media should be substantially inert to the ABS resin, it may be itself quite dynamic. The function of a dynamic system may be better understood with reference to FIG. 1. It has been found, as shown in FIG. 1, that in a media where glycol diacetate has limited solubility, such as water, optimum results will be obtained when glycol diacetate concentration is within about 4% of solution saturation. Curve A, for instance, illustrates the average bond strength which can be obtained on a given ABS resin substrate using a solution containing pure glycol diacetate at a given temperature, in the present instance about 95° F.

Glycol diacetate will, however, hydrolyze in the presence of water to form acetic acid and ethylene glycol. This reaction is reversible and adheres closely to the law of mass action. Temperature will increase reaction velocity but has little effect on equilibrium. The acetic acid formed increases the solubility of glycol diacetate, as is shown in curve B. To maintain optimum bond strengths requires the addition of glycol diacetate to augment the effect of the formation of acetic acid to keep glycol diacetate concentration to within about 4% of saturation.

The presence of hydrogen ions also catalyzes the hydrolysis reaction and will cause curve B to shift to the right as more acetic acid is formed.

It has been found that the effect of the formation of acetic acid can be offset by the addition of alkalis, such as sodium hydroxide, potassium hydroxide or ammonium hydroxide. The alkalis should be added with vigorous stirring and only in an amount sufficient to keep the system close to neutral and ideally at a pH below about 7.2.

Acetate salts will form thereby and will generally reduce the solubility of the glycol diacetate and the system will perform in the manner depicted in curve C. Although less glycol diacetate will be solubilized in a system containing acetate salts, optimum bond strength will still be obtained without a change in any of the other parameters, such as temperature or residence time, provided glycol diacetate concentration is maintained within about 4% by volume of saturation. Control may also be accomplished by adding a buffering agent, such as sodium acetate, to the system to keep the solution close to neutral. Preferably, sodium acetate is added as the initial ingredient to the water based media containing glycol diacetate and from time to time as conditions require to maintain the solution close to neutral. The effect that the presence of sodium acetate has is to again diminish solubility of glycol diacetate and, depending on sodium acetate concentration, the performance curve will generally be close to that depicted in curve C.

Although generally even the presence of low concentrations of glycol diacetate will have a positive effect on bond strength, as indicated, it has been observed, as illustrated in FIG. 1, that optimum results are obtained at glycol diacetate concentration within about 4% of saturation, where the glycol diacetate has limited media solubility. As shown, this has been quite unexpectedly found to hold true independent of the point of saturation. For instance, the maximum concentration of glycol diacetate in water at 95° F. is approximately 15.8%. As indicated, this upper limit will be increased by the presence of acetic acid alone and decreased by the presence of acetate salts. However, independent of the shift of the saturation point, the average bond strength obtained between the electroless deposited metal and the ABS resin substrate will be optimized when glycol diacetate concentration is within about 4% by volume of solution saturation. As further illustrated by FIG. 1, there is little variation in bond strengths obtained within this range. This offers operational latitude and a strong tolerance for lack of attention by workers.

When a media other than water is used, and in which a higher degree of glycol diacetate solubility is available, it is preferred to have glycol diacetate present in an amount only sufficient to cause a de-glazing and satinizing of the surface of the ABS resin substrate. While not bound by theory, this is believed to have the effect of initially increasing the porosity of the surface, thereby making the butadiene portion of the surface more susceptible to attack with the strong oxidizing acid. Generally, the amount of glycol diacetate required for this result, where it is substantially or infinitely soluble in the carrier media, is generally less than about 40% by volume. Non-ionic wetting agents may be advantageously added to the pre-etch solutions of this invention to further promote uniform etching.

It is contemplated within the ambit of this invention that there may also be present other materials in minor amounts which may serve as solvents for ABS resins. When present, however, they must not cause gelation of the surface, which has been found to be detrimental to the appearance of the finished article.

Since the action of the glycol diacetate solutions is only to de-glaze and satinize the surface of the ABS resin substrate, the substrate may be safely immersed in the etchant for long periods of time. For practical reasons, however, residence times ranging from about ½ to about 3 minutes, preferably about 1 minute, are typically employed.

Solution temperature is not narrowly critical. However, elevated temperatures speed the conditioning process and temperatures from about 90° F. up to the softening point of the ABS resin, preferably from about 90° to about 130° F., and more preferably from about 100° to 110° F., may be advantageously employed.

In the instance of operating at elevated temperatures, water shows its value as the solution media. Since glycol diacetate has only a limited solubility in water, the surface layer will be predominately water and the loss of glycol diacetate by evaporation will be small.

After conditioning the surface of the ABS resin with the glycol diacetate solution according to the practice of this invention, the article may then be simply rinsed and passed directly to a strong oxidizing acid solution where the butadiene portion of the ABS resin is attacked, and then on to a conventional electroless plating operation.

Figure 2:
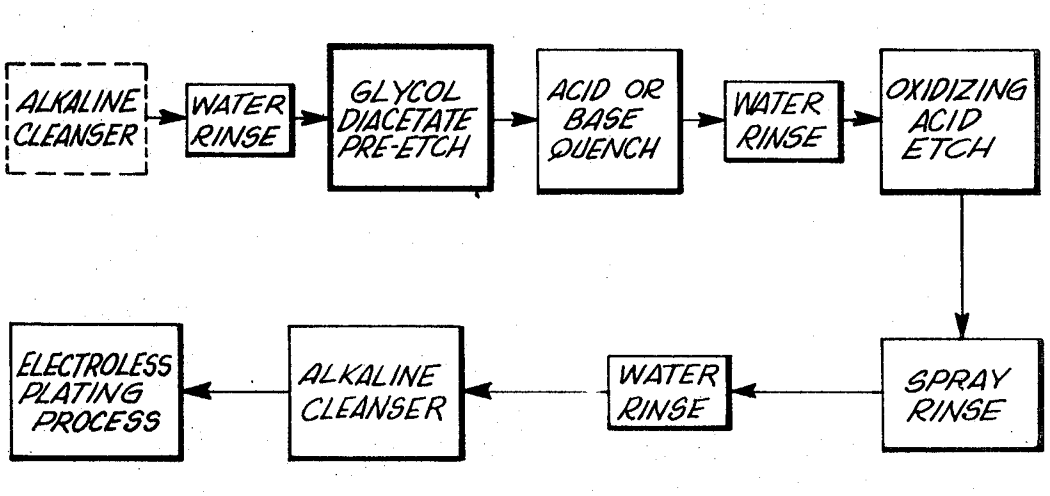
FIG. 2 is a schematic representation of the preferred procedure to be followed in preparing the ABS resin substrate for electroless plating.

While the pre-etch with a glycol diacetate solution, in accordance with the practice of this invention, is adaptive to any electroless plating operation, it is preferred for optimum results to follow the procedure shown schematically in FIG. 2. With reference thereto, the articles to be treated for electroless plating are optionally washed in an alkaline cleanser, generally maintained at a temperature of about 130° F. to remove any grease or oil on the surface of the articles. Residence time is short, generally only from about 1 to 2 minutes. This step may be eliminated when the ABS resin articles are obtained grease free. When the article is, however, cleansed with the alkaline cleanser, it is then rinsed in water, preferably de-ionized water, before contact with the glycol diacetate solution.

As indicated, the glycol diacetate pre-etch solution is preferably maintained at a temperature of from 90° F. up to the softening point of the ABS resin and residence time in the pre-etch solution is generally short, ranging from about ½ to about 3 minutes, preferably about 1 minute. Longer residence time may be employed but no particular advantage appears to be gained.

Although the conditioned article may now be rinsed with water, preferably de-ionized water, and passed directly to the strong oxidizing acid etchant, it is preferred to immerse the article for a short period of time, generally from about 30 to about 120 seconds, in a 1 to 5 normal acid or basic solution to hydrolyze any glycol diacetate remaining on the surface. Any acid or base, with the exception of acetic acid, may be used. This solution is normally maintained at room temperature and serves to quench the glycol diacetate etch and thereby prevents contamination of the strong oxidizing acid with hydrolysis products.

After quenching, the article is rinsed in water again, preferably de-ionized water, and passed on to a strong oxidizing acid etch. While any of the known oxidizing acid solutions for the butadiene portion of the ABS resin may be employed, it is preferred to use a pure chromic acid etch. The chromic acid etch used contains from about 8.5 to about 10.5 lbs. of chromic acid per gallon of solution, which is above the normal solubility of chromic acid in water. Higher solubility, however, is achieved by the presence of trivalent chromium, which is formed in the reduction of the hexavalent chromium during oxidation of the ABS resin surface. An initial solution of high chromic acid content may be conveniently obtained by the addition of oxalic acid to a chromic acid solution to form trivalent chromium ions followed by the addition of chromium trioxide to the resultant solution to form an oxidizing acid of the desired hexavalent chromium assay. The etch with the strong oxidizing acid is generally at a temperaure from about 110° F. to distortion temperature of the ABS resin, preferably from about 110° to about 160° F., and more preferably from about 140° to about 150° F. Residence times ranging from about 5 to about 10 minutes, depending upon the nature of the ABS resin treated, are generally employed.

After etching with the strong oxidizing acid, the ABS resin is then passed on to a spray rinse where any of the remaining acid is forcibly washed from the surface of the article.

Following this there may be one or more rinses in water and then a final cleansing with an alkaline cleanser, which is free of silicates. This cleanser is preferably mild and free of caustics. The cleanser is generally maintained at temperatures from about 110° to about 130° F. and the residence time of the article is from about 3 to about 5 minutes.

After final alkaline cleansing, the article may now be passed on to any of the electroless plating operations, employing either copper or nickel. Conveniently, the conditioned ABS article may be immersed in a solution of stannous chloride-hydrochloric acid to sensitize the plastic surface by adsorption of stannous ions. This is generally followed by immersion in a solution of a noble metal salt, e.g., palladium chloride, to activate the ABS article by a reaction resulting in the reduction of the noble metal ions to the metal. The noble metal film on the ABS article then acts as a catalyst in the electroless metal bath into which the activated ABS article is passed.

A variety of electroless copper and nickel formulations may be used. For example, electroless copper formulations essentially consist of a soluble cupric salt, such as copper sulfate; a complexing agent for the cupric ion, such as Rochelle salt; and alkali hydroxide for adjustment of pH; a carbonate radical as a buffer; and a reducing agent for the cupric ion, such as formaldehyde. The mechanism by which objects having catalyzed surfaces, for example, an ABS article having catalytic palladium metal in its surface, as previously discussed, is plated auto-catalytically in such solutions, has been explained in the literature, for example, Pat. No. 2,874,072, issued Feb. 17, 1959.

Following electroless plating the ABS article may be electrolytically plated by conventional means with copper, nickel, gold, silver, chromium and the like to provide the desired finish on the article. In such operations ultimate adhesive strength is dependent, in part, on metal to metal bond strength. It has been observed that aging the electroless plated ABS article for periods as long as 24 hours or more has a beneficial effect on metal to plastic bond strength. We have observed, however, that this is offset in part by a tendency of the surface to oxidize and for absorbed salts to migrate to the surface of the article and dry. These phenomena have a deleterious effect on appearance and metal to metal bond strength. We have found that immersion of the electrolessly plated ABS article in an aqueous solution containing an anionic or non ionic surface active agent in an amount of from about 0.5 to about 2.0% by volume provides a thin film of protective coating on the surface of the article during aging. Any water soluble anionic or non ionic surface active agent, such as, for instance, ethylene oxide condensates containing at least about 8 ethylene oxide groups; phosphate, sulfate and sulfonate modified ethylene oxides; alkylaryl sulfates; dimethyl octane diol; oxyethylated sodium salts; amine polyglycol condensates; modified linear alcohol ethoxylates; alkylphenol ethoxysulfates; sodium heptadecrylsulfates and the like, as well as mixtures thereof may be used. Generally, contact with the aqueous surfactant solution follows about a 4 to 5 minute immersion in tap water and a de-ionized water rinse. Providing the thin film prevents corrosion and drying out of absorbed salts. After aging for the desired period of time, usually 15 minutes or more using forced warm air to 4 hours or more at ambient temperatures, the protective coating is removed by contact with an alkaline cleanser and a brief rinse in sulfuric acid. When the coating has been removed, the electrolessly plated article is then electrolytically plated.

Although many of the steps may be conveniently eliminated and the glycol diacetate conditioned article may be passed after a water rinse directly to the oxidizing acid and thereafter directly to the electroless plating step, it has been observed that exercising care in thoroughly cleansing the article each conditioning step has a cumulative beneficial effect. This is manifested in the observation that adhesion to control specimens, which have not been conditioned by contact with glycol diacetate, show improved adhesion relative to accepted adhesion standards.

When glycol diacetate is used as the dominant pre-etchant under conditions where it will only cause a satinizing of the ABS resin substrate, it has been found that articles so treated will be uniform in appearance. The deposited metal coating will be uniform and the bond strength of both electrolessly deposited copper and nickel to the surface will be unusually high independent of the electroless deposition technique employed. Moreover, high bond strengths, often above 30 lbs./inch, are achieved without undermining or adversely affecting the resin integrity. During standard destruct peel tests it has been determined that failure is mainly at the resin-metal interface and there is little or no removal of plastic from the ABS substrate with the metal. This bond strength is improved without undermining the structural integrity of the ABS resin.

While no wise limiting, the following are illustrative examples of the practice of this invention. In all instances where comparisons were made, the ABS resin articles were molded from identical resins under identical conditions to eliminate the known parameters associated with resin differences and the method of article preparation. Peel strengths were determined by pulling a one-inch strip of the deposited metal at an angle of 90° to the resin surface using a Dillon peel tester.

EXAMPLES 1–6

Using the procedure set forth above and as illustrated in FIG. 2, cylindrical articles fabricated from ABS resins were conditioned for electroless plating using an aqueous solution containing glycol diacetate at a concentration of 11.5% by volume maintained at a temperature of 105° F. For comparative purposes, an identical article was, in each instance, conditioned for plating without pre-etching with glycol diacetate. The results are shown in Table I in which peel strengths were adusted to an average plate thickness of 4 mils and where the controls were articles which were not subject to pre-etch using the glycol diacetate solution.

TABLE I

| | Electroless solution | Average peel strength, lbs./in. | Average range of peel strength, lbs./in. |
|---|---|---|---|
| Example 1 | Copper | 23.37 | 22.5 to 32. |
| Control A | do | 18.58 | 16.0 to 22. |
| Example 2 | do | 27.0 | 19.5 to 30.5. |
| Control B | do | 18.80 | 16.0 to 21. |
| Example 3 | do | 25.35 | 19.75 to 31.5. |
| Control C | do | 17.57 | 13.5 to 20.75. |
| Example 4 | Nickel | 25.39 | 15.5 to 34. |
| Control D | do | 15.69 | 4.5 to 21.75. |
| Example 5 | do | 23.66 | 13.0 to 31.5. |
| Control E | do | 14.81 | 6.75 to 21.25. |
| Example 6 | do | 26.30 | 23.25 to 30.25. |
| Control F | do | 18.88 | 13.25 to 20.5. |

EXAMPLE 7

A more generalized procedure was used wherein the samples were simply rinsed with de-ionized water after immersion for 1 minute in a solution of the following composition:

| | Percent by volume |
|---|---|
| Glycol diacetate | 41 |
| Acetic acid | 40 |
| Ethylene glycol | 19 |

maintained at a temperature of 105° F. An average peel strength of 22 lbs./inch was obtained for electroless copper plated plaques. Identical plaques processed without the pre-etch exhibited a peel strength of 9.5 lbs./inch.

EXAMPLE 8

The procedure of Example 7 was repeated except that there was used as the pre-etch a solution of the following composition:

| | Percent by volume |
|---|---|
| Glycol diacetate | 37 |
| Acetic acid | 36 |
| Ethylene glycol | 17 |
| Water | 10 |

As compared to the peel strength of 9.5 lbs./inch for untreated plaques, there was obtained an average peel strength of 20 lbs./inch for electroless deposited copper.

EXAMPLE 9

The procedure of Example 7 was repeated except there was used as the pre-etch a solution of the following composition:

| | |
|---|---|
| Glycol diacetate | 13.6% by volume. |
| Acetic acid | 13.3% by volume. |
| Ethylene glycol | 6.4% by volume. |
| Sodium acetate | 20.0 by weight to volume. |
| Water | Balance. |

The average peel strength obtained was 19 lbs./inch for electroless deposited copper.

EXAMPLE 10

Following the procedure set forth in Example 7, plaques were treated in a 12% solution of glycol diacetate in water maintained at a temperature of 105° F. for 1 minute. The plaques were rinsed, electrolessly plated with copper, then plated electrolytically with bright, ductile acid copper to a thickness of 4 mils. Average peel strength was found to be 23 lbs./inch. An identical control plaque not treated in the glycol diacetate solution exhibited a peel strength of 12 lbs./inch.

What is claimed is:

1. In a process for the electroless plating of an acrylonitrile-butadiene-styrene resin with a metal, which includes the step of contacting the resin surface with a strong oxidizing acid to promote adhesion of the electroless deposited metal; the improvement which comprises contacting the acrylonitrile-butadiene-styrene resin surface with a solution of glycol diacetate in an amount up to solution saturation in a media substantially inert with respect to the acrylonitrile-butadiene-styrene resin for a time sufficient to de-glaze and satinize the resin surface prior to contact with the strong oxidizing acid.

2. A process as claimed in claim 1 in combination with the additional step of hydrolyzing the glycol diacetate remaining on the resin surface after de-glazing and satinizing and before contact with the strong oxidizing acid.

3. A process as claimed in claim 1 in which the inert media is an aqueous media.

4. A process as claimed in claim 3 in which the glycol diacetate concentration in the aqueous media is maintained within about 4% by volume of solution saturation.

5. A process as claimed in claim 4 in which a buffering agent is present.

6. A process as claimed in claim 5 in which the buffering agent is sodium acetate.

7. A process as claimed in claim 1 in which the glycol diacetate solution is maintained at a temperature of from about 90° F. to about 130° F.

8. A process as claimed in claim 1 in which the contact time is from about 0.5 to about 3 minutes.

9. A process as claimed in claim 7 in which the contact time is from about 0.5 to about 3 minutes.

10. A process as claimed in claim 1 in which the strong oxidizing acid is an aqueous solution containing chromic acid and trivalent chromium ions.

11. A process as claimed in claim 10 in which the chromic acid concentration is from about 8.5 to about 10.5 pounds per gallon of solution.

12. A process as claimed in claim 1 in combination with the additional step of immersing the electrolessly plated acrylonitrile-butadiene-styrene article in an aqueous solution containing a surface active agent selected from the group consisting of anionic and non-ionic surface active agents in an amount of from about 0.5 to about 2.0% by volume to provide a protective thin film coating on the surface of the article during aging before electrolytic plating.

13. A solution for deglazing and satinizing the surface of acrylonitrile-butadiene-styrene resins prior to contacting the surface with an oxidizing acid to condition the surface for electroless plating, which comprises an aqueous solution of glycol diacetate, in which the glycol diacetate concentration is within 4 percent by volume of solution saturation.

14. A solution as claimed in claim 13 in which a buffering agent is present.

15. A solution as claimed in claim 14 in which the buffering agent is sodium acetate.

16. A solution as claimed in claim 13 in which a nonionic wetting agent is present.

17. A solution as claimed in claim 13 in which the pH is maintained at a level below about 7.2.

18. A solution for deglazing and satinizing the surface of acrylonitrile-butadiene-styrene resins prior to contacting the surface with an oxidizing acid to condition the surface for electroless plating which comprises a solution of glycol diacetate in an amount up to solution saturation and a minor amount of a buffering agent in a media substantially inert with respect to the acrylonitrile-butadiene-styrene resin.

19. A solution as claimed in claim 18 in which the buffering agent is sodium acetate.

20. A solution as claimed in claim 18 in which a nonionic wetting agent is present.

21. A solution as claimed in claim 18 in which the pH is maintained at a level below about 7.2.

References Cited

UNITED STATES PATENTS

| | | | |
|---|---|---|---|
| 3,479,160 | 11/1969 | Klinger et al. | 29—195 |
| 3,515,649 | 6/1970 | Hepfer | 204—38 |

JACOB H. STEINBERG, Primary Examiner

U.S. Cl. X.R.

156—2, 3; 117—47 A; 204—38